(12) United States Patent
Schroeder

(10) Patent No.: US 6,308,911 B1
(45) Date of Patent: Oct. 30, 2001

(54) METHOD AND APPARATUS FOR RAPIDLY TURNING A VEHICLE IN A FLUID MEDIUM

(75) Inventor: Wayne K. Schroeder, Arlington, TX (US)

(73) Assignee: Lockheed Martin Corp., Grand Prairie, TX (US)

( * ) Notice: Subject to any disclaimer, the term of this patent is extended or adjusted under 35 U.S.C. 154(b) by 0 days.

(21) Appl. No.: 09/183,502

(22) Filed: Oct. 30, 1998

(51) Int. Cl.[7] ........................................... F42B 15/01
(52) U.S. Cl. ..................... 244/3.22; 244/3.1; 244/3.15; 244/3.21
(58) Field of Search ........................ 244/3.1, 3.15, 244/3.2, 3.21–3.29, 3.3; 102/374–381

(56) References Cited

U.S. PATENT DOCUMENTS

| | | |
|---|---|---|
| 3,034,434 | 5/1962 | Swaim et al. . |
| 3,139,033 | 6/1964 | Geissler et al. . |

(List continued on next page.)

FOREIGN PATENT DOCUMENTS

| | | |
|---|---|---|
| 0 058 258 | 8/1982 | (EP) . |
| 0447284 | 9/1991 | (EP) . |
| 0489712A2 | 6/1992 | (EP) . |
| 0489712A3 | 6/1992 | (EP) . |
| 0604263 | 6/1994 | (EP) . |
| 0 882 647 | 12/1998 | (EP) . |
| 2203223 | 10/1988 | (GB) . |
| 2 316 663 | 3/1998 | (GB) . |
| WO/88 04400 | 6/1988 | (WO) . |
| WO/94 00731 | 1/1994 | (WO) . |

OTHER PUBLICATIONS

John H. Blakelock; *Automatic Control of Aircraft and Missiles;* 1991; ch. 7; pp. 229–259.

*Primary Examiner*—Bernarr E. Gregory
(74) *Attorney, Agent, or Firm*—Sidley Austin Brown & Wood; Stephen S. Sadacca

(57) ABSTRACT

In a first aspect, the invention uses the thrust and axial aerodynamic forces of and on the missile system as the primary mechanism for altering the missile system's flight path as opposed to the missile system's aerodynamic normal force. In accordance with this first aspect, a first embodiment is a method for changing the direction of travel of a vehicle moving through a fluid medium to a desired direction of travel measured in the vehicle's inertial frame of reference, the vehicle comprising a body including a nose, a moment generating control device, and an axial propulsive device. The method comprises actuating the moment generating control device to align the nose substantially with the desired direction of travel, and applying the axial propulsive device as the primary mechanism to redirect the vehicle's velocity to the desired direction of travel. In a second aspect, the invention provides a missile control system implementing the first aspect of the invention. In a third aspect, the invention simulates in software a missile control system implementing the first aspect of the invention.

81 Claims, 11 Drawing Sheets

U.S. PATENT DOCUMENTS

| | | |
|---|---|---|
| 3,282,541 | 11/1966 | Webb . |
| 3,362,658 | 1/1968 | Ito et al. .................................. 244/3.2 |
| 3,724,781 | 4/1973 | Makow ................................ 244/3.23 |
| 3,984,072 * | 10/1976 | Von Pragenau et al. ....... 244/3.21 X |
| 4,116,404 | 9/1978 | Howell ................................ 244/3.23 |
| 4,171,115 | 10/1979 | Osder .................................... 244/181 |
| 4,531,693 | 7/1985 | Raynaud et al. ........................ 244/52 |
| 4,589,594 | 5/1986 | Kranz . |
| 4,624,424 | 11/1986 | Pinson ................................. 244/3.21 |
| 4,699,333 | 10/1987 | Pinson ................................. 244/3.21 |
| 4,830,311 | 5/1989 | Pritchard et al. ................... 244/3.15 |
| 4,867,393 | 9/1989 | Faupell et al. ...................... 244/3.22 |
| 4,883,239 | 11/1989 | Lachmann et al. ................. 244/3.15 |
| 5,054,712 * | 10/1991 | Bar et al. ............................ 244/3.22 |
| 5,058,836 | 10/1991 | Nobel .................................... 244/176 |
| 5,070,761 | 12/1991 | Fidler ................................... 89/1.809 |
| 5,074,492 | 12/1991 | Morgand ............................. 244/3.22 |
| 5,088,658 | 2/1992 | Forsmo ................................ 244/3.21 |
| 5,094,406 | 3/1992 | Shafer ................................. 244/3.21 |
| 5,123,611 | 6/1992 | Morgand ............................. 244/3.22 |
| 5,129,604 * | 7/1992 | Bagley ............................. 244/3.21 X |
| 5,259,569 | 11/1993 | Waymeyer et al. .................. 244/3.22 |
| 5,349,532 | 9/1994 | Tilley et al. . |
| 5,393,012 | 2/1995 | Dunn ................................... 244/3.23 |
| 5,439,188 | 8/1995 | Depew, Jr. et al. ................. 244/3.21 |
| 5,452,864 | 9/1995 | Alford et al. ....................... 244/3.23 |
| 5,564,651 | 10/1996 | Wiemer et al. ..................... 244/3.21 |
| 5,590,850 | 1/1997 | Cannon et al. ..................... 244/3.15 |
| 5,593,109 | 1/1997 | Williams ............................. 244/3.21 |
| 5,630,564 | 5/1997 | Speicher et al. .................... 244/3.24 |
| 5,679,919 | 10/1997 | Holm et al. .......................... 102/377 |
| 5,806,791 | 9/1998 | Hatalsky et al. .................... 244/3.24 |
| 5,835,869 | 11/1998 | Schroeder ................................ 701/4 |

* cited by examiner

METHOD AND APPARATUS FOR RAPIDLY TURNING A VEHICLE IN A FLUID MEDIUM

BACKGROUND OF THE INVENTION

1. Field of the Invention

This invention relates in general to the field of maneuver control of a vehicle traveling through a fluid environment and, more particularly, to a maneuver strategy to improve rapid turning capability.

2. Description of the Related Art

FIG. 1 illustrates a conventional vehicle 50 capable of traveling through a fluid medium, e.g., air, water, and plasma. The particular embodiment of the vehicle 50 illustrated is a missile system designed to travel through air. Although the invention is disclosed herein primarily in the context of a missile system, it is to be understood that the invention is not so limited. The invention is disclosed in the context of a missile system for the sake of clarity and to facilitate understanding of the invention. Those skilled in the art having the benefit of this disclosure will recognize that the teachings herein can be extrapolated to other vehicles capable of traveling through other fluid media, e.g., a torpedo traveling through a body of water.

The missile system 50 illustrated in FIG. 1 can be described as an elongated body 100 that travels through a fluid medium, typically the earth's atmosphere. The missile 100 has a forward section 102 and an aft section 104 divided by the missile body 100's center-of-gravity 105, the forward section 102 having a control device 110. Missile control devices can fundamentally be categorized as forward aerodynamic, e.g., canards; forward propulsive, e.g., a thruster; aft aerodynamic, e.g., fins; and aft propulsive, e.g., thrust vector control. Thus, it will be apparent to those skilled in the art having the benefit of this disclosure that other control devices alternative to those shown in FIG. 1 are possible and may even be desirable depending on the particular application for the missile system 50. For instance, the forward control device 110, a set of thrusters in the embodiment illustrated, may be implemented with canards, instead. Control devices may also be used in tandem.

Certain aspects of a missile's maneuverability are typically expressed in terms of angles. FIG. 2 illustrates the angle nomenclature typically used by those in the art to describe missile maneuverability. The nomenclature is frequently defined in terms of an inertial coordinate system that is fixed relative to the earth. An axis in this coordinate system is an "inertial axis." For simplicity, a single pitch plane will be used to define the nomenclature although those in the art will recognize that more than one plane might be relevant in some circumstances. The angle 200 between the nose 215 of the missile system 50 and the inertial axis 205 is called the pitch angle. The angle 210 between the nose 215 of the missile 50 and the missile's velocity vector 220 is called the angle-of-attack. The angle 225 between the velocity vector 220, i.e., the magnitude and direction of the missile's travel, and the inertial axis 205 is called the flight path angle. Thus, as shown in FIG. 2, for pitch plane maneuvers, the pitch angle 200 is the sum of the angle-of-attack 210 and the flight path angle 225.

Missiles are typically directed toward a target. This target may be in the form of a set of inertial coordinates or a physical object or a combination of both. If the missile is stationary at launch, its initial flight path angle 225, is aligned with the missile's nose or equal to its pitch angle 200. If the missile is air launched, the missile's initial flight path angle is inherited by the flight path angle of the host aircraft and launcher imposed dynamics. The initial flight path angle 225 is typically not equal to the flight path angle desired to reach the target. The missile must maneuver to change its current flight path angle 225 to its desired flight path angle.

Typically, a missile system relies on aerodynamic force to maneuver. In the atmosphere, the amount of force the missile system can receive from aerodynamics exceeds the amount of lateral control force that can be packaged in the missile at altitudes of less than about 20 km. Because of this, the primary purpose of control mechanisms is generating a moment to rotate the nose of the missile to produce the angle-of-attack 210. The angle-of-attack 210, in turn, generates an acceleration normal to the missile body which results in a rotation of the missile's flight path angle 225. Maintaining an adequate missile velocity to supply the necessary aerodynamic forces and moments is required to maneuver in the conventional manner.

More particularly, and referring again to FIG. 1, a force generated by a control device, such as the forward control device 110, generates a moment, or torque, on the missile body 100 about the center-of-gravity 105 of the missile body 100. Below an altitude of approximately 20 km, a missile system's primary source of transverse acceleration is the aerodynamic force resulting from the missile body 100's angle-of-attack. Flight control devices, e.g., forward thrusters 110, are commanded by control processes encoded in and executed by computational devices carried by the missile system to generate moments and forces and obtain this angle-of-attack.

FIG. 3 is a functional block diagram of a missile control system 301 for the conventional missile system 50 of FIG. 1. Block 330 represents the physical system, i.e., the missile, and incorporates descriptions of all vehicle subsystems including, for example, control actuation, propulsion, and inertial measurement systems as well as the aerodynamic configuration. The missile guidance logic 310 determines a desired kinematic trajectory by commanding a dynamic response that results in a change to the missile's flight path. The vehicle's measured dynamic response is shown as feedback signal 305. This signal encodes, for example, a measurement of the missile's rotational rates, translational rates, accelerations, and inertial orientation. In general terms, the autopilot controller 325 is a control process that uses the difference between desired missile responses, e.g., rates, accelerations, or attitudes, and the measured responses to define a set of error signals 320 which the controller uses to encode control commands 330 for a control actuation device, e.g., thruster level, that is a part of the vehicle dynamics and kinematics 300.

The energy necessary to operate a flight control device is very precious in an operational sense. A missile system can carry only a limited amount of energy, e.g., energy stored as rocket fuel, batteries, etc. Strategically, altering the amount of energy that may be provided can affect the missile system's range and performance against a target. Tactically, the energy is conserved as much as possible so that the missile system can retain its ability to maneuver from the time it is deployed to the time it reaches the target. Thus, the energy necessary to operate the flight control device is an important design consideration for both the physical structure of the missile system and its operation.

Air launched missiles are typically mounted in a forward facing direction where the nose of the missile is aligned with the nose of the host aircraft. A missile able to reverse the direction of its flight path, e.g., 180° turn, is able to provide a capability to destroy rearward approaching aircraft before they are able to be within firing range of the host aircraft. A combat advantage is also provided in a fly-by scenario where an enemy aircraft passes the host aircraft traveling the opposite direction. If the missile can turn rapidly enough, the enemy aircraft can not escape being defeated. Thus, the time which the maneuver consumes, the velocity of the missile after the maneuver, and the turning radius or distance which the missile deviated from its desired flight path is critical to the life and death nature of the engagement.

Thus, one application exhibiting an immediate need for improved efficiency in maneuvering is an air launched interceptor missile. The intuitive approach to reversing an air launched interceptor missile's flight path based on conventional maneuver control is a steady high-g turn. The missile system applies control force to rotate the missile system's nose to a desired angle-of-attack to achieve an aerodynamic normal force providing a lateral component of acceleration to rotate the missile system's velocity vector and therefore its flight path angle. During the intuitive maneuver, forward velocity is necessary to produce aerodynamic force and to maintain an angle-of-attack. The angle-of-attack is typically limited to reduce the parasitic effects of aerodynamic axial forces, to maintain stability of the vehicle during the sustained maneuver, and to constrain aerodynamic loading beneath the structural limit of the missile body.

FIG. 4 illustrates the first 1.25 seconds of an exemplary trajectory of the missile system 50 in FIG. 1 performing the sustained maneuver in the vertical plane. The inertial orientation of the missile system 50 is shown at intervals of 0.25 seconds during the maneuver. As is evident from FIG. 4, this maneuver requires a large turning diameter. FIG. 5 graphs the total missile velocity as a function of the inertial x-axis or downgrade progress for the first five seconds of flight in the maneuver of FIG. 4, illustrating the energy expended in the direction opposite the desired maneuver direction.

One missile system developed specifically for such demanding maneuvers is the Python 4 manufactured by Rafael Industries and sold by the Israeli government, a line drawing of which is shown in FIG. 6. The Python 4 includes twenty-one (21) flight surfaces to achieve this performance-an inordinately high number of flight surfaces for a missile system that makes it expensive to manufacture and difficult to maintain. One reason for the Python 4's design complexity is the demands of implementing the intuitive approach for reorienting the missile described above and illustrated in FIG. 4. The Russian AA-11 missile system shown in FIG. 7, likewise, implements this intuitive approach to reorient the missile system to perform a 180° turn.

The present invention is directed to improving performance and to overcoming, or at least reducing the effects of, one or more of the problems set forth above.

SUMMARY OF THE INVENTION

In a first aspect, the invention uses the thrust and axial aerodynamic forces of and on the missile system as the primary mechanism for altering the missile system's flight path as opposed to the missile system's aerodynamic normal force. In accordance with this first aspect, a first embodiment is a method for changing the direction of travel of a vehicle moving through a fluid medium to a desired direction measured in the vehicle's inertial frame of reference, the vehicle comprising a body including a nose, a moment generating control device, and an axial propulsive device. The method comprises actuating the moment generating control device to align the nose substantially with the desired direction of travel, and applying the axial propulsive device as the primary mechanism to redirect the vehicle's velocity to the desired direction of travel.

In a second aspect, the invention provides a vehicle implementing the first aspect of the invention.

In a third aspect, the invention simulates in software a missile control system implementing the first aspect of the invention.

BRIEF DESCRIPTION OF THE DRAWINGS

Other objects and advantages of the invention will become apparent upon reading the following detailed description and upon reference to the drawings in which:

FIG. 9A graphs the change in altitude of the trajectories as a function of the distance taken to perform them;

FIG. 9B compares the trajectories for the conventional and inventive maneuvers for the first five seconds of flight;

FIG. 9C illustrates total velocity magnitude as a function of downgrade distance for the first five seconds of flight;

FIG. 9D shows the velocity components for each method of maneuvering; and

FIG. 9E shows the axial aerodynamic force constructively to aide in arresting the initial velocity of the vehicle;

FIG. 15A compares the angle-of-attack histories over the first 3.5 seconds of flight;

FIG. 15B compares the transverse acceleration load factor experienced by a missile performing the respective maneuvers for the first 3.5 seconds of flight;

FIG. 15C compares the total velocity magnitude as a function of missile pitch orientation for the respective maneuvers over the first 5 seconds of flight; and FIG. 15D compares the magnitude of horizontal inertial velocity as a function of downgrade distance traveled for the respective maneuver.

Figure 1:
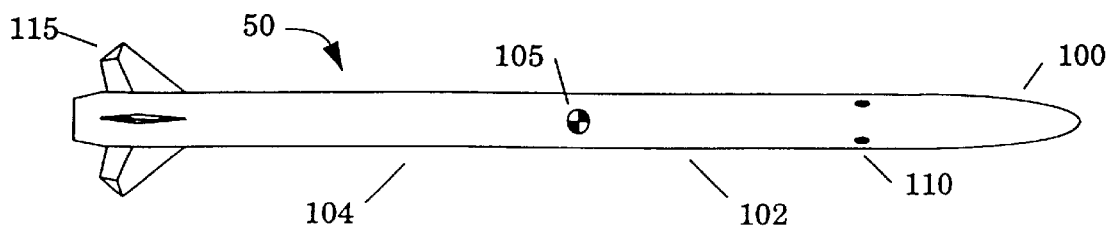
FIGS. 1–2 illustrate several concepts associated with the control of a missile system's orientation in an inertial reference frame.
Figure 2:
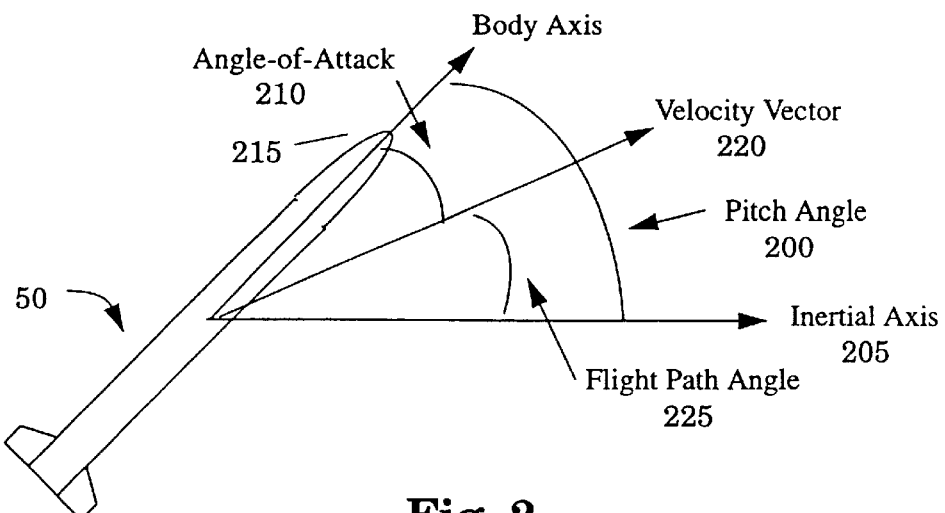
Figure 3:
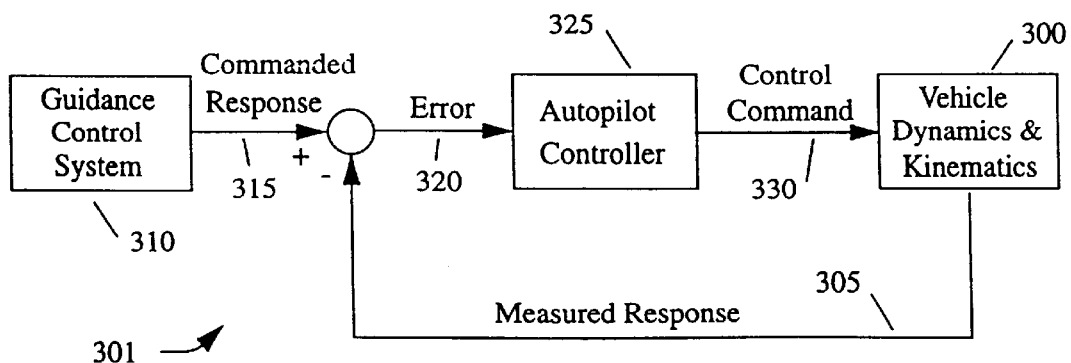
FIG. 3 illustrates a conventional missile control system for the missile system of FIG. 1 as may be utilized to control a vehicle to perform the conventional, high-g maneuver of FIG. 4.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

One aspect of the invention is a method for controlling the orientation of a vehicle traveling through a fluid medium. As previously noted, the invention shall be disclosed in the context of a missile system, but the invention is not so limited. More particularly, in one embodiment, the invention is a method for changing the direction of travel of a vehicle moving through a fluid medium to a desired direction of travel measured in the vehicle's inertial frame of reference, the vehicle comprising a body including a nose, a moment generating control device, and an axial propulsive device. The method comprises actuating the moment generating control device to align the nose substantially with the desired direction of travel; and applying the axial propulsive device as the primary mechanism to redirect the vehicle's velocity to the desired direction of travel.

As used herein, the phrase "desired direction of travel" refers to the direction defined by the flight path angle desired to reach an intended target. The characteristics of the inventive process are easily distinguishable for changes in flight path angle of magnitudes greater than 60°. Thus, "changing the direction of travel" and "aligning with a desired direction of travel" refer to required maneuvers for a difference between the desired flight path angle and current flight path angle of 60° or greater. These maneuvers are distinguishable from "course corrections" once a desired flight path angle has been achieved. Similarly, "substantially aligning the nose of the vehicle in the desired direction of travel" refers to causing the nose of the vehicle to point in the desired direction of travel independent of the current direction of travel. The term "substantially" in this context refers to achieving angles within 20% of the desired flight path angle. Furthermore, the "nose" of the vehicle as used herein shall refer to that portion of the vehicle that is ultimately to be aligned in the desired direction of travel. Thus, the "nose" of the vehicle may not, in all embodiments, be what one might otherwise intuitively identify as the nose. The "primary mechanism" as used herein refers to the greatest, or most significant, contributor to change the vehicle flight path angle.

The method for controlling the orientation of the missile system may be implemented in a variety of alternative embodiments. For instance, the thrust may be applied before or after the vehicle is partially or fully rotated. Thus, actuation of the axial propulsive device may be initiated before the nose is aligned substantially in the desired direction of travel so long as the actuation continues after the substantial alignment with the desired direction of travel. Further, applying the controlled moment may include providing a low variation center-of-pressure travel as a function of the missile system's angle-of-attack, being assisted by the vehicle's aerodynamic rotational moment, and/or providing a low variation of aerodynamic center-of-pressure travel as a function of the vehicle's Mach number. Still further, applying the controlled moment may include damping the reorientation with a propulsive device and/or initiating the reorientation with a propulsive device.

Figure 8:
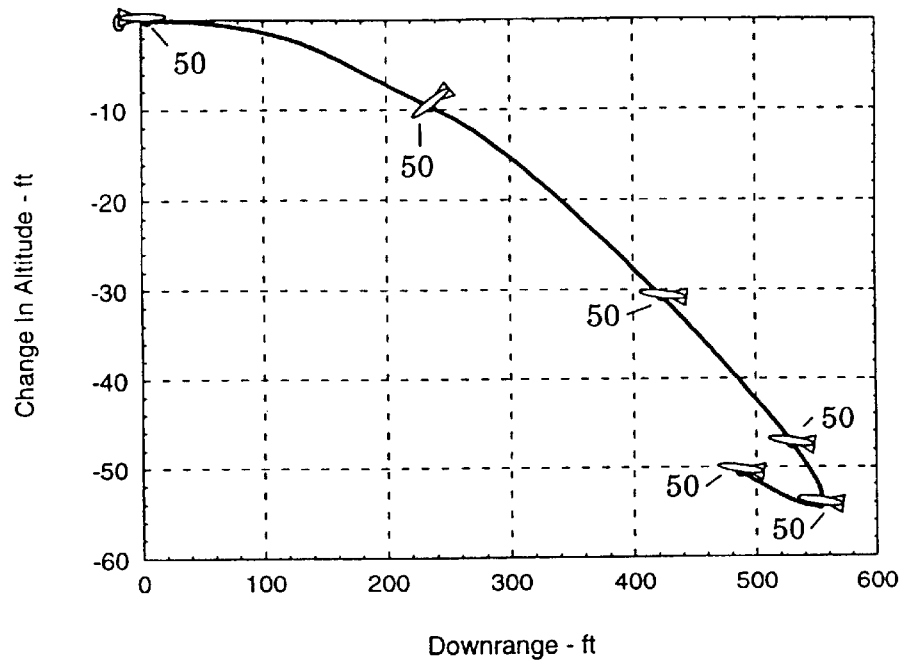
FIG. 8 depicts the trajectory of a missile system operated in accordance with one embodiment of a first aspect of the present invention.

FIG. 8 illustrates one particular embodiment of this aspect of the invention wherein the vehicle is a missile and the fluid medium is the earth's atmosphere. This aspect of the invention uses the thrust and axial aerodynamic forces of and on the missile system as the primary mechanisms for altering the missile system's flight path as opposed to the missile system's aerodynamic normal force. The control force rotates the missile system's nose rapidly and substantially to the desired flight path direction while the amount of thrust applied in the direction of travel is maximized. FIG. 8 illustrates the velocity vector of the missile system performing a maneuver in a vertical plane in conjunction with the invention. As will be recognized by those skilled in the art having the benefit of this disclosure, the maneuver can be performed in any plane and not just the vertical plane illustrated in these simulation results.

Figure 4:
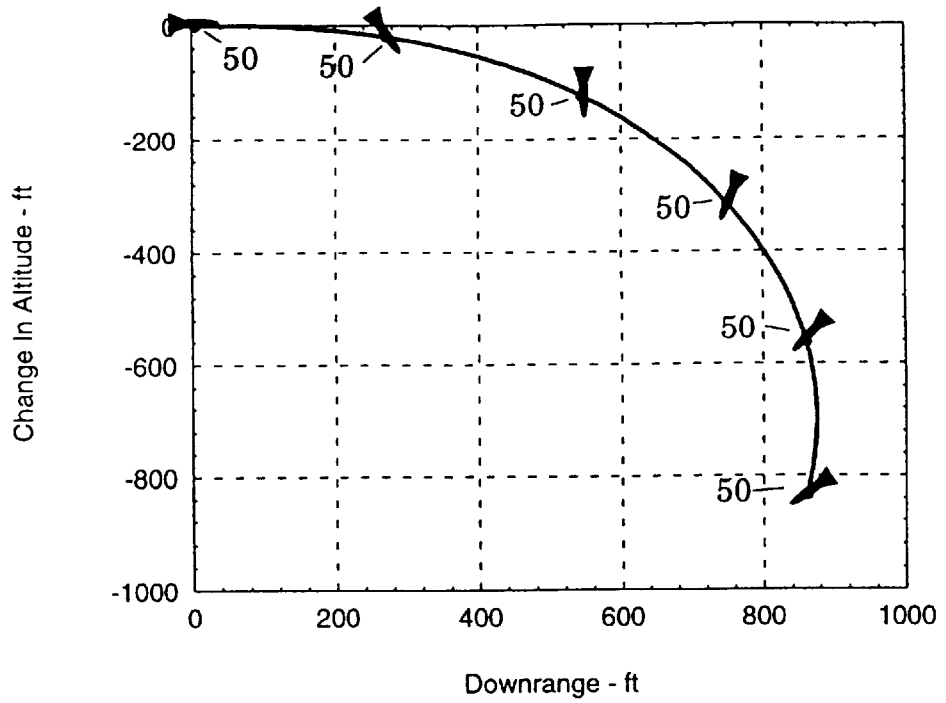
FIG. 4 depicts the trajectory of a conventional, sustained high-g maneuver used to reorient a missile system such as the one depicted in FIGS. 1–3.
Figure 5:
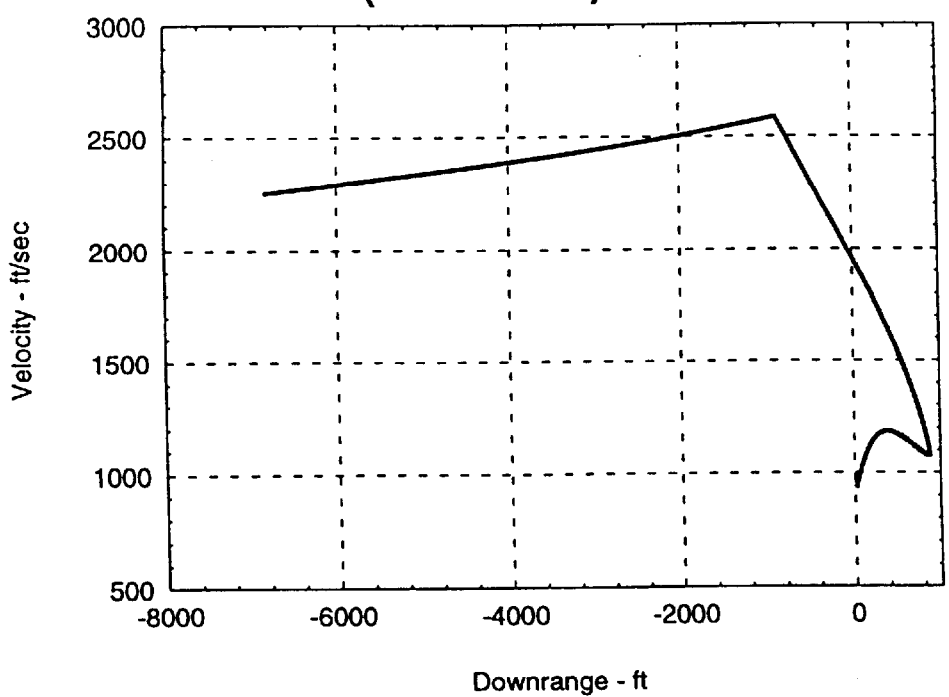
FIG. 5 graphs the velocity of the missile system in FIG. 4 in inertial space.
Figure 6:
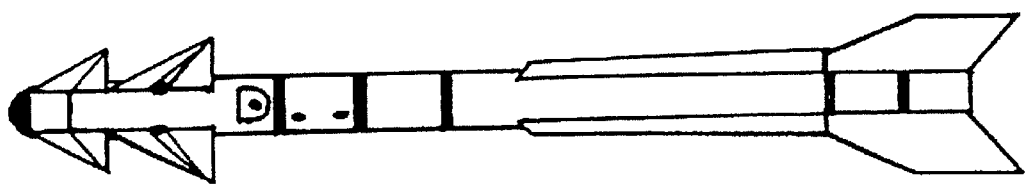
FIGS. 6–7 depict prior art missile systems that employ the conventional, high-g maneuver of FIG. 4.
Figure 7:
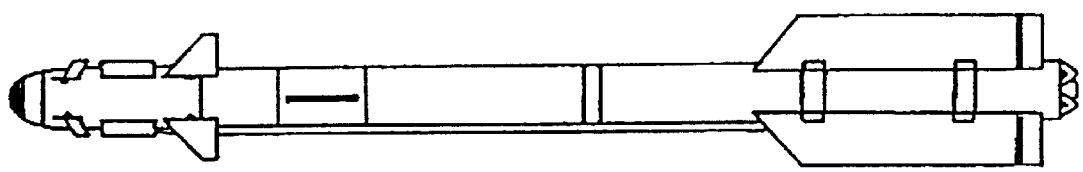
Figure 9A:
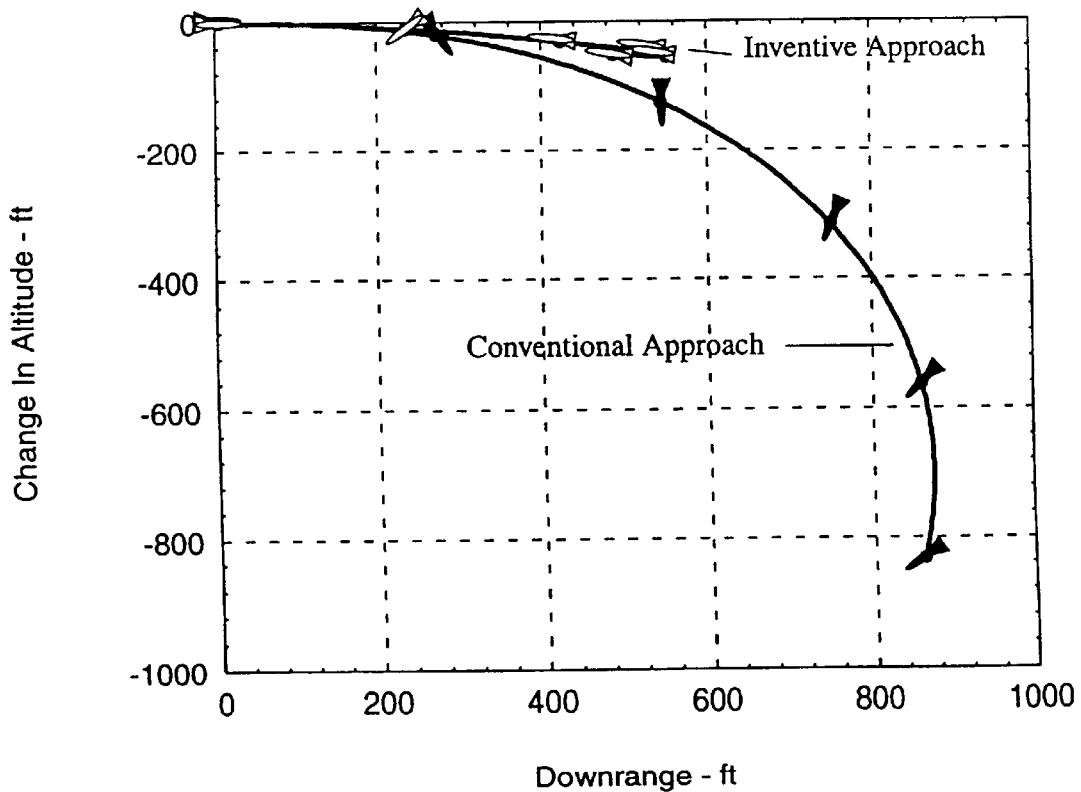
FIGS. 9A–9E graphically compare the maneuver depicted in FIG. 8 with the maneuver in FIG. 4, and, more particularly.
Figure 9B:
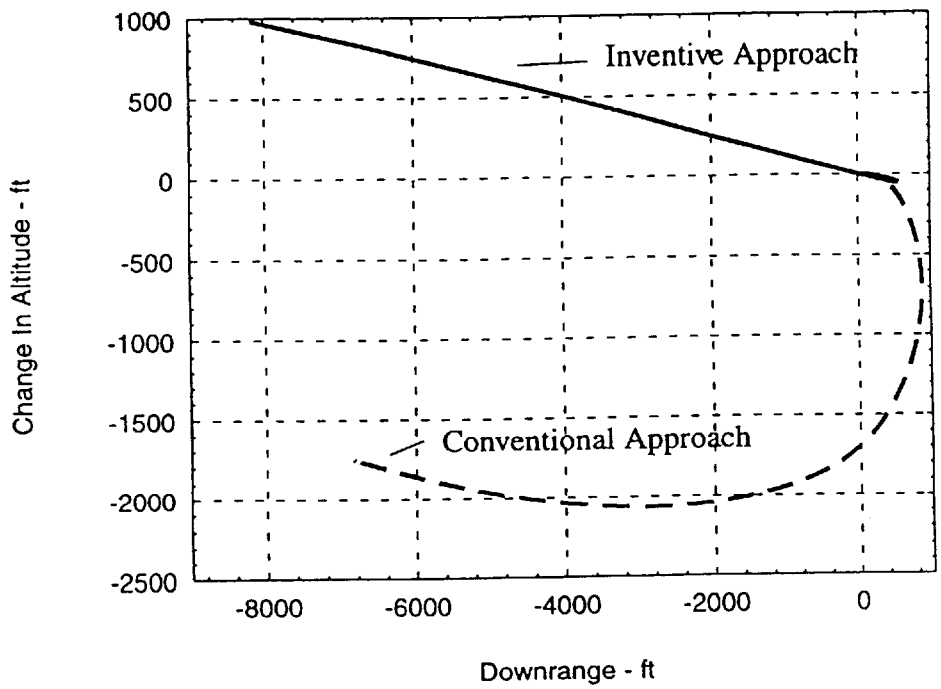
Figure 9C:
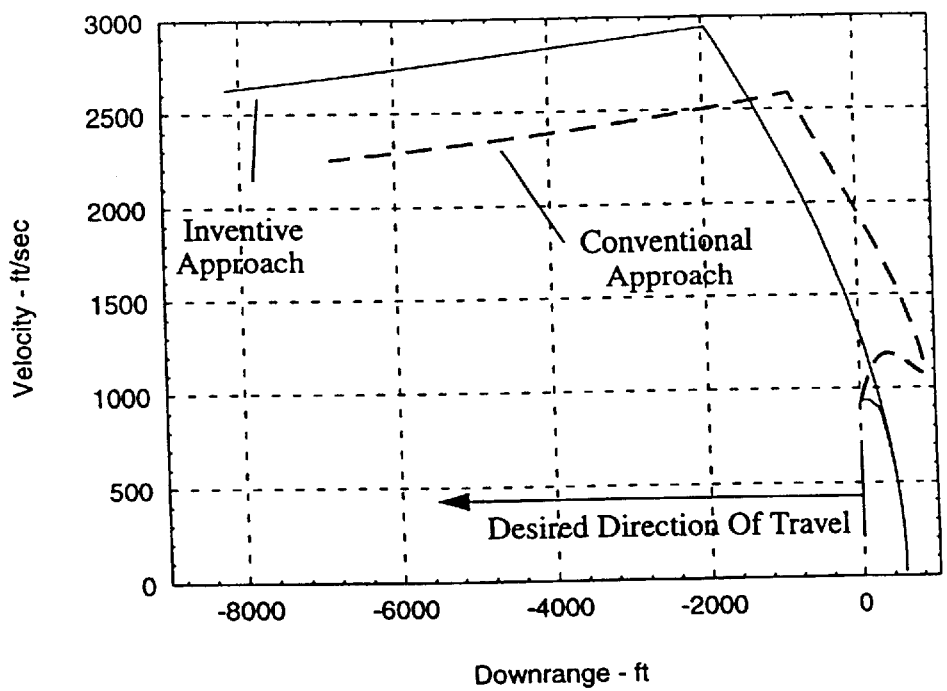
Figure 9D:
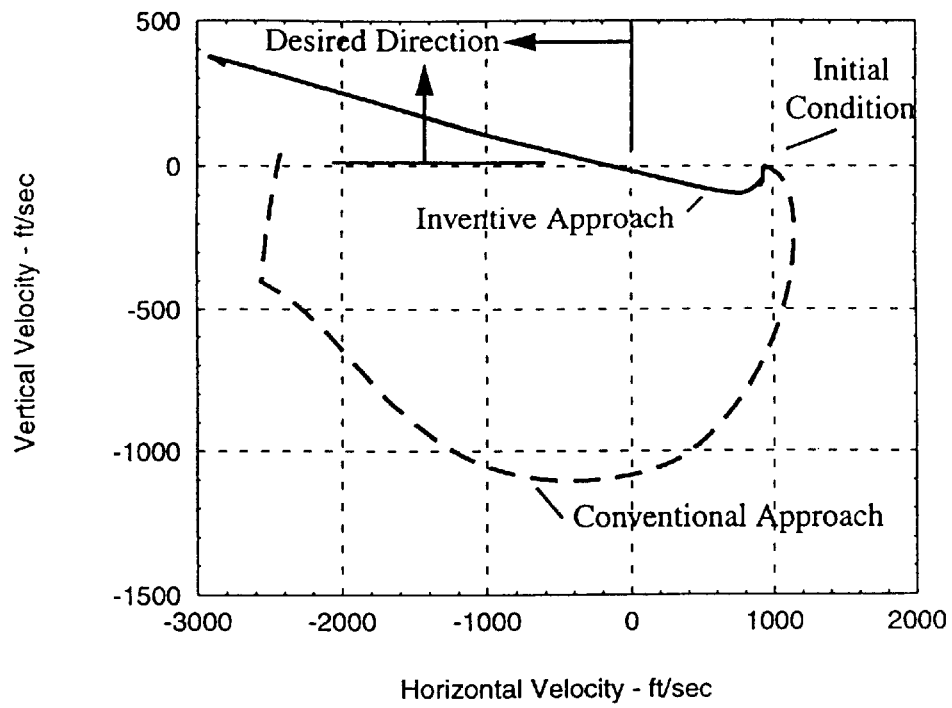
Figure 9E:
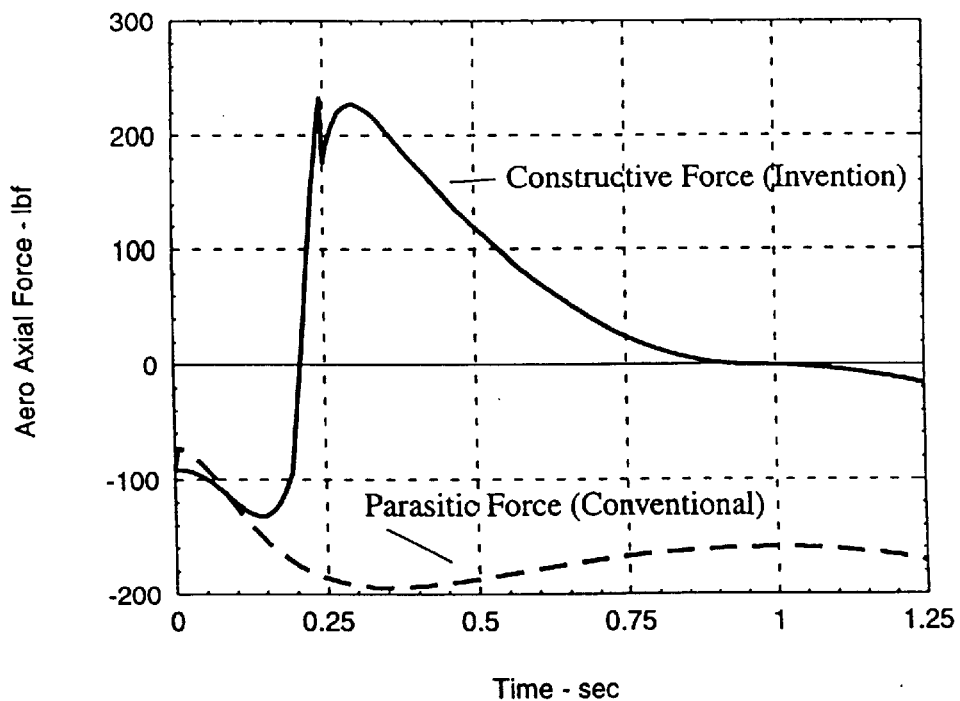

FIGS. 9A–9E compare various aspects of the inventive method whose trajectory is illustrated in FIG. 8 with those of the conventional method of FIG. 4. More particularly:

FIG. 9A compares the first 1.25 seconds of the two trajectories for the same missile performing a 180° turn, illustrating the timeline and turning radius advantages of the invention;

FIG. 9B compares the trajectories for the conventional and inventive maneuvers for the first 5 seconds of flight and shows, with the solid line, the advantage of the invention over the conventional approach in terms of downgrade distance, tighter turning radius, and initial altitude toward a lofted trajectory;

FIG. 9C illustrates the advantage achieved in total velocity magnitude as a function of downgrade distance for the first 5 seconds of flight, and, consequently, the improved use of available energy gained by applying thrust forces substantially in the desired maneuver direction;

FIG. 9D shows the velocity components for each method of maneuvering to illustrate the advantageous, more efficient use of the missile's velocity vector toward the desired direction of travel; and FIG. 9E shows the axial aerodynamic force constructively to aide in arresting the initial velocity of the vehicle as opposed to the parasitic effect drag conventionally has.

During the maneuver, the magnitude of the vehicle's velocity will become small. This is not detrimental to the maneuver performance in the present invention, unlike traditional approaches. Because of the use of the rocket motor thrust profile in the implementation of the invention, the efficiency of the turn can be further improved by delaying the rocket motor ignition until some rotation of the missile system has already taken place. This is because all energy expended in a direction away from the desired maneuver direction must be overcome.

Figure 11:
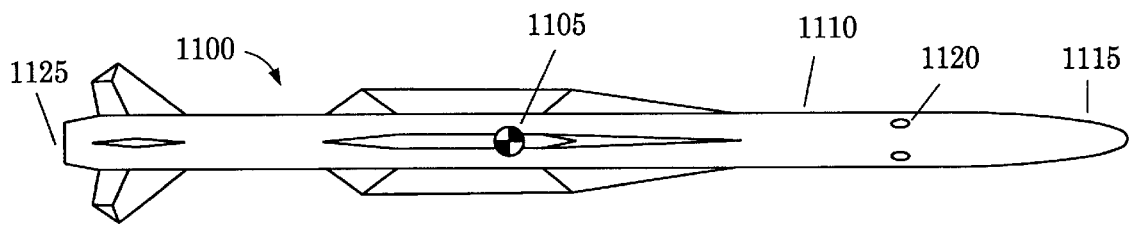
FIG. 11 depicts one particular embodiment of a missile system with which the present invention may be implemented.

The present invention, in a second aspect thereof, includes a vehicle by which the maneuver of FIG. 8 may be performed. FIG. 11 depicts one particular embodiment of a missile system 1100 with which the present invention in its various aspects may be implemented. The missile system 1100 has a center-of-gravity 1105 and comprises a body 1110 including a nose 1115, a moment generating control device 1120, and an axial propulsive device 1125. The maneuver of FIG. 8 changes the direction of travel of the missile system 1100 moving through a fluid medium to a desired direction of travel measured in the missile system's inertial frame of reference. More particularly, the maneuver of FIG. 8 in this embodiment includes actuating the moment generating control device 1120 to align the nose 1115 substantially with the desired direction of travel, and applying the axial propulsive device 1125 as the primary mechanism to redirect the missile system's velocity to the desired direction of travel.

Variations on this particular embodiment are readily extrapolated from the above discussion. 18. For instance, the moment generating control device 1120 is a propulsive thruster control system, but may, in alternative embodiments, be implemented as any a forward aerodynamic control device, a forward propulsive control device, an aft aerodynamic control device, and an aft propulsive device. The propulsive thruster control system is therefore but one, exemplary means for generating a moment. Similarly, the axial propulsive device 1125 pictured in FIG. 11 includes a rocket motor and is an exemplary means for axially propelling the vehicle 1100.

Variations on the performance of the maneuver in FIG. 8 with the missile system 1100 of FIG. 11 may also be readily extrapolated from this disclosure. Actuating the moment generating control device 1120 may include actuating a propulsive thruster control system, initiating the substantial alignment of the nose 1115 with the desired direction of travel with a propulsive device, and/or damping the reorientation with a propulsive device. Applying the axial propulsive device 1125 may include operating a rocket motor and, in some variations, delaying the ignition thereof until body 1100 is partially or fully rotated. The alignment of the nose 1115 may be aided by the missile system's aerodynamic pitching and/or yawing, a low variation of aerodynamic center-of-pressure travel as a function of the missile system's angle-of-attack, and/or a low variation of aerodynamic center-of-pressure travel as a function of the missile system's Mach number. Applying the axial propulsive device 1125 as the primary mechanism to redirect the missile system's velocity may also be aided by aerodynamic axial force.

In one variation of this particular embodiment, the missile system 1100 includes an 8" diameter, 12' long body 1110 with the aerodynamic center-of-pressure characteristics and center-of-gravity characteristics discussed below. The vehicle 1100 of this particular variation weighs 308 pounds at launch. An all-boost thrust profile of 12,000 pounds of thrust for 2.5 seconds is used for notional rocket motor characteristics. The missile 1100 is launched at an altitude of 20,000 feet with an initial inertial velocity of 933.57 feet/sec, or a Mach of 0.90, which is typical of a scenario in which the invention may be used. The thrust profile is non-optimized. The performance can be improved with a more ideal thrust profile and the use of the invention is not limited to a specific thrust profile type, e.g., all-boost, boost-sustain, pulsed, etc.

Figure 10:
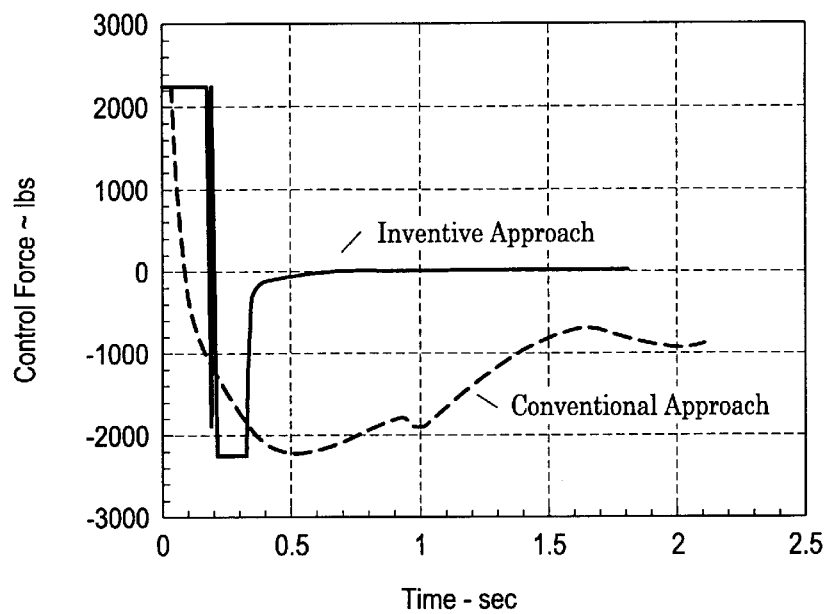
FIG. 10 compares the thrust provided by the control device of the present invention as a function of time for the maneuvers of FIGS. 4 and 8 for the time duration which it takes for the missile to return through the vertical maneuver plane.

The inventive approach uses available control energy in a more efficient manner. FIG. 10 graphs the thrust provided by the control device as a function of time for the inventive approach, the solid line, and the conventional approach, the dotted line, for the time duration which it takes for the missile to return through the vertical maneuver plane. For a thruster propellant characterized by a specific impulse of 251 seconds, the inventive approach consumes 3.1 pounds of thruster propellant and the conventional approach consumes 11.7 pounds of thruster propellant.

Since a maneuver implemented according to the invention will transition through small velocity magnitudes, a propulsive control device may be advantageously employed to implement the method. The propulsive device may be situated in the forward portion of the missile as divert thrusters or in the rear portion of the missile as thrust vector control or divert thrusters in various embodiments. For the embodiment illustrated, the propulsive device is a forward thruster control device.

Since a limited amount of control force can be packaged in the vehicle, it is useful to design the aerodynamic surfaces to reduce the amount of control force required. Thus, a wing surface may be located toward the middle of the vehicle which has the overall effect of reducing the distance between the point at where the accumulated aerodynamic forces act, known as the center-of-pressure, and the point about which the missile rotates, known as the center-of-gravity. It is desirable for the variation in axial location of the center-of-pressure location to be small as the missile experiences different Mach numbers and angles-of-attack throughout its flight and during maneuvering. A configuration can be considered to have a low center-of-pressure variation if the travel of the center-of-pressure for the initial 90° angle-of-attack is less than three calibers or body diameters distance.

Figure 12A:
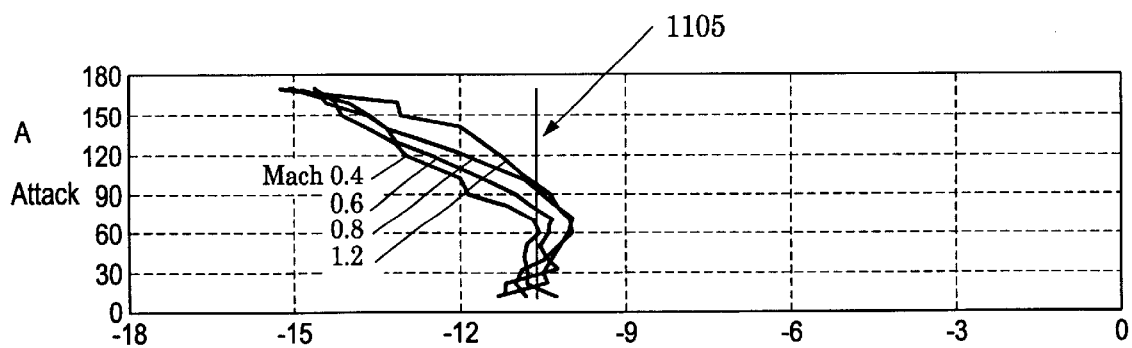
FIGS. 12A–12C plot the angle-of-attack versus longitudinal center-of-pressure location and center-of-gravity location as a function of missile Mach number, the thruster control command versus the angle-of-attack, and the aerodynamic moment versus the angle-of-attack, respectively, for the missile system of FIG. 11.
Figure 12B:
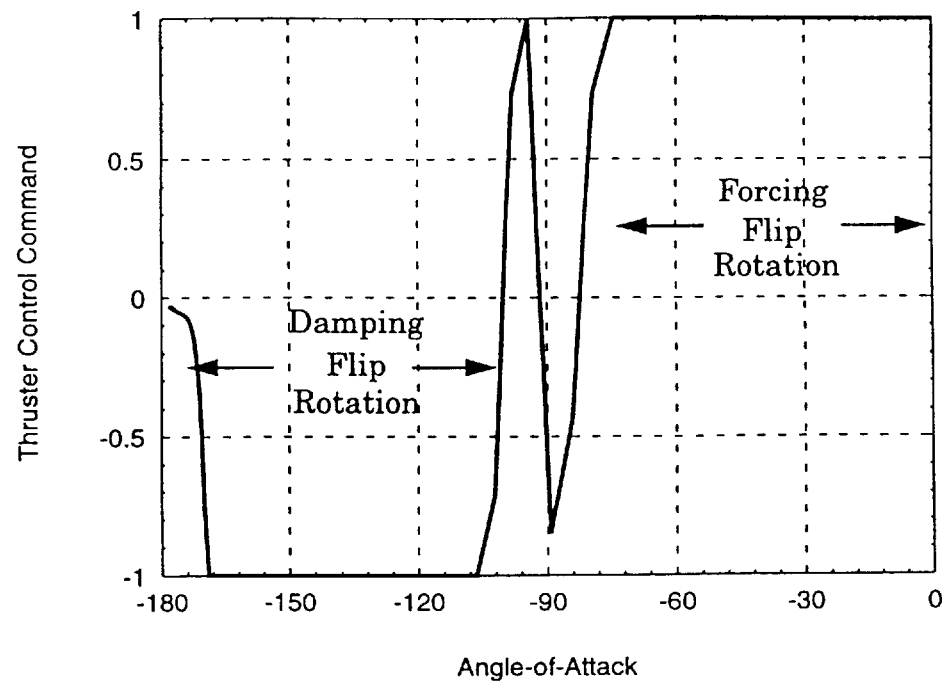

The missile system of FIG. 11 accomplishes this design objective and the aerodynamic center-of-pressure location as a function of missile angle-of-attack and Mach number and the center-of-gravity locations for launch and at rocket motor depletion or "burn-out." A design configured in like manner reduces the amount of aerodynamic moment that the control device must overcome during the first 90° of rotation of the maneuver by making the aerodynamic moment arm small. FIG. 12A illustrates how the nonlinear aerodynamic moments associated with a configuration design of this type can aide the maneuver by providing aerodynamic moments at the beginning portion of the maneuver to help increase the rotation rate (conventionally considered unstable) and provide aerodynamic moments at the end of the maneuver to help damp or "catch" the maneuver. FIG. 12B illustrates how the control signal from the autopilot implementing the invention commands a thrust substantially in a direction to "catch" the rotation for the angles-of-attack greater than 90°.

Figure 12C:
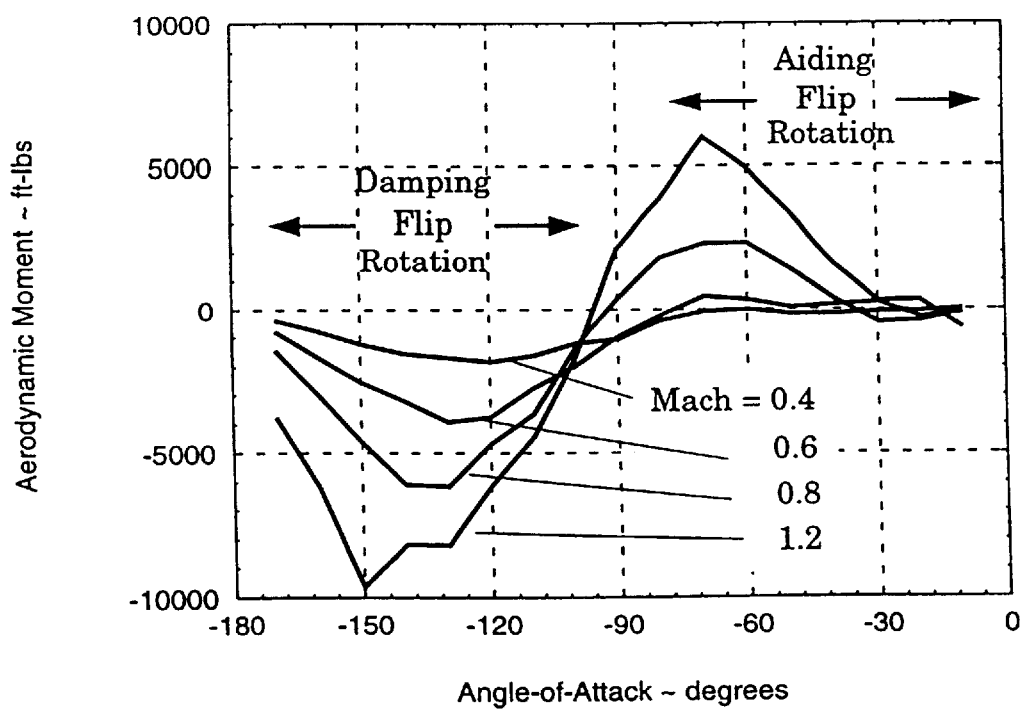

FIG. 12C also illustrates how the nonlinear aerodynamic moments associated with a configuration design of this type can aide the maneuver by providing aerodynamic moments at the beginning point of the maneuver to help increase the rotation rate (conventionally considered unstable) and provide aerodynamic moments at the end of the maneuver to help damp the maneuver.

Figure 13:
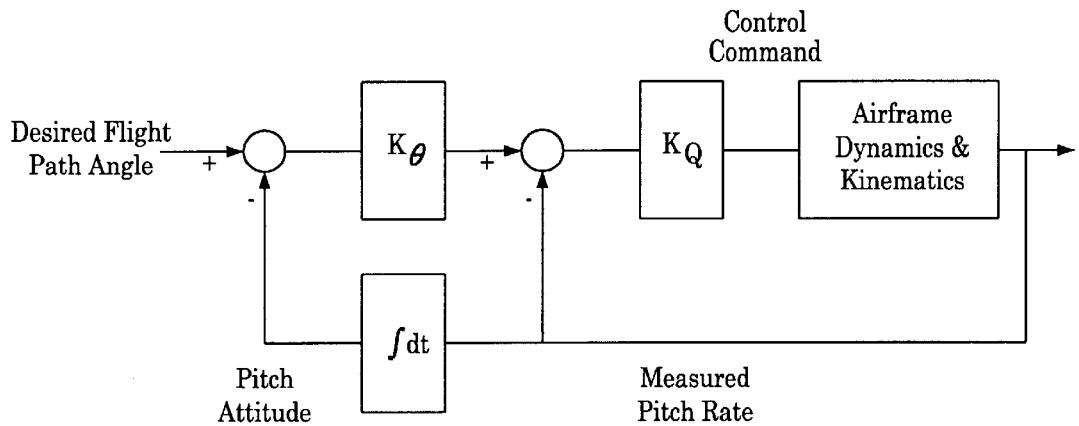
FIG. 13 illustrates an autopilot as may be utilized to control a highly maneuverable vehicle to perform the maneuver of FIG. 8 in a second aspect of the invention.

FIG. 13 illustrates an autopilot as may be utilized to control a vehicle in accordance with the present invention, e.g., to perform the maneuver of FIG. 8. The autopilot controller receives a command signal from the guidance control system representing the magnitude and direction of a desired flight path angle. This signal is converted to a forward thruster control signal using the control logic illustrated in FIG. 13. As would be realized by those ordinarily skilled in the art having the benefit of this disclosure, the gains in this control system can be adjusted to alter the behavior of the controller. The gains for the inventive control system are chosen to rapidly achieve a missile orientation which is substantially similar to the desired flight path angle. This criterion ignores the limits of conventionally imposed angle-of-attack and stability constraints.

For comparison, a controller developed for the conventional approach to turning a missile is developed. The autopilot controller receives a command signal from the guidance control system representing the magnitude and direction of a desired flight path angle. This signal is converted to a forward thruster control signal using the control logic illustrated in FIG. 14. As would be known to those in art, the gains in this control system can be adjusted to alter the behavior of the controller. One approach to a conventional autopilot converts the desired flight path angle to an angle-of-attack command. The angle-of-attack command is typically limited to decrease the effects of parasitic drag and to maintain stability of the missile.

Figure 14:
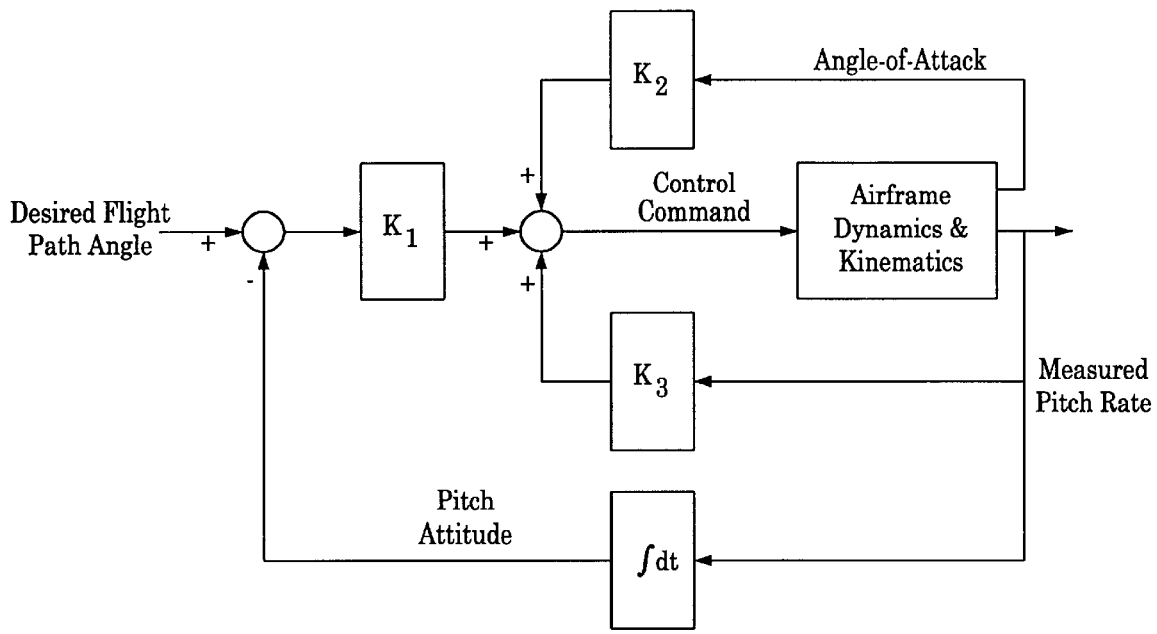
FIG. 14 illustrates a conventional autopilot such as might be employed by the missile system of FIGS. 1–3, but which may also be utilized to perform the maneuver of FIG. 8.

At the initiation of the maneuver, both the conventional autopilot of FIG. 14 and the inventive autopilot of FIG. 13 receive a command reflecting a desired flight path in the opposite direction of the initial flight path. Each autopilot responds in accordance with the desired behavior for which it was designed. Both autopilots command a control force and resulting moment to rotate the missile to reduce the angle between the initial flight path and the desired flight path. The conventional autopilot limits the angle between the missile nose and the missile velocity vector to maintain the source of aerodynamic lateral force for turning, reduce the effects of drag, and to maintain stability. FIG. 1 SA shows the angle-of-attack time history of the inventive approach, the solid line, and the conventional approach, the dotted line, illustrating the radically different flight regimes of the two approaches. The inventive approach flies substantially backward for a brief period of time during which the aerodynamic axial force and thrust are used to arrest and reverse the missile's velocity magnitude. The conventional approach implements a substantially steady turn while maintaining the missile's velocity and aerodynamic loading. A distinguishing characteristic of this invention is that angles-of-attack greater than 90° can be achieved for rear hemisphere engagements. FIG. 15B shows the transverse acceleration load factor for each of the two methods of maneuvering, illustrating that the magnitude and duration of the loading is less for the inventive approach.

One distinguishing performance characteristic is the more efficient use of energy toward the direction of travel. The conventional maneuver bleeds off energy due to drag and time in the maneuver. FIG. 20 shows the velocity of the conventional and the inventive approach as a function of pitch attitude, illustrating that the inventive maneuver does not substantially change the missile's velocity until it is substantially pointed in the desired direction of travel while the conventional approach is consuming energy by increasing the missile's velocity in a direction away from the desired maneuver direction.

Figure 15A:
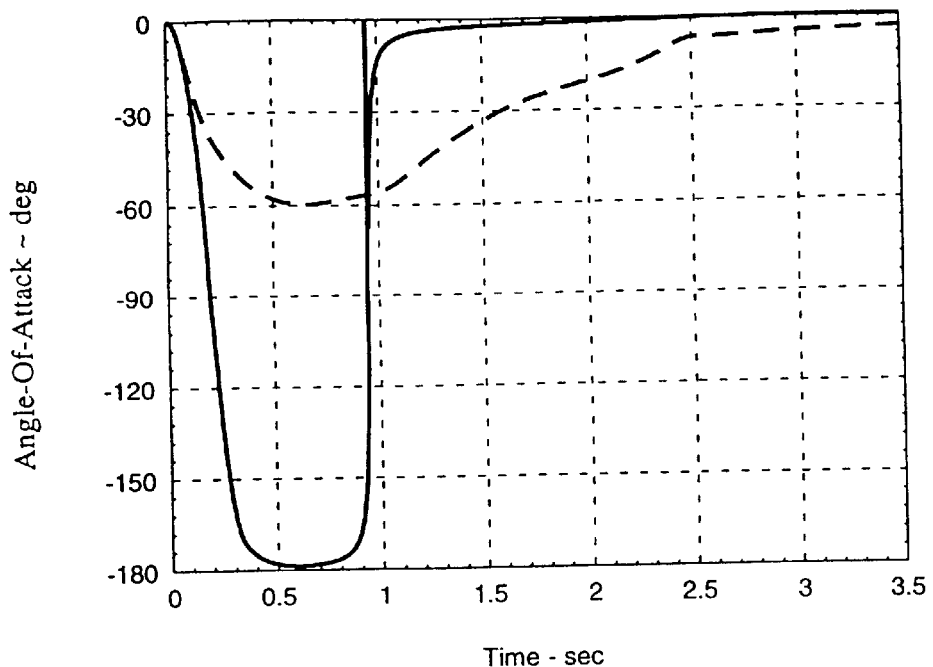
FIGS. 15A–15D compare various parameters of the maneuver of FIG. 8 with those of the maneuver of FIG. 4, and, more particularly.
Figure 15B:
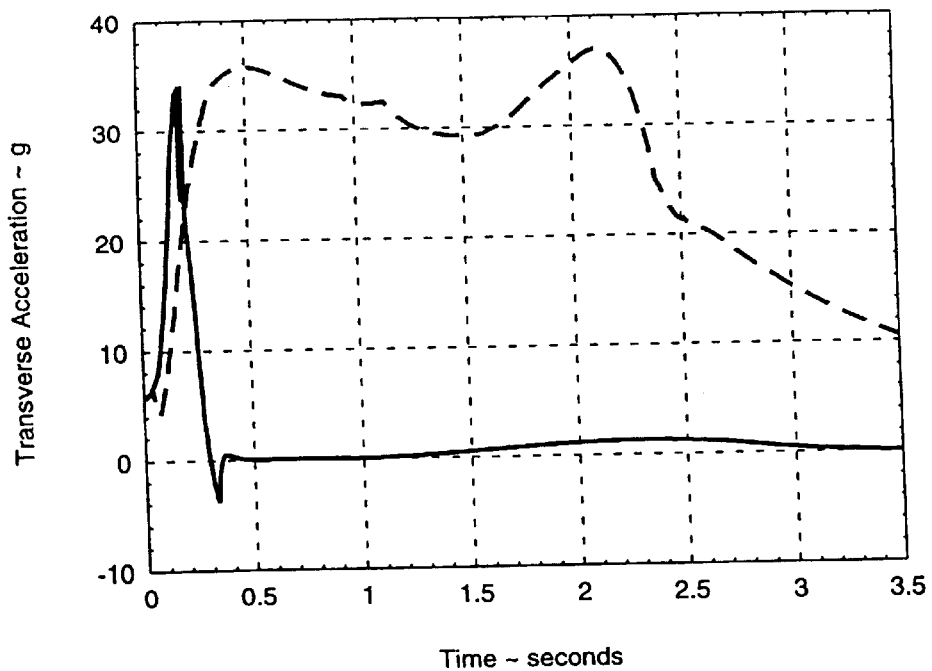
Figure 15C:
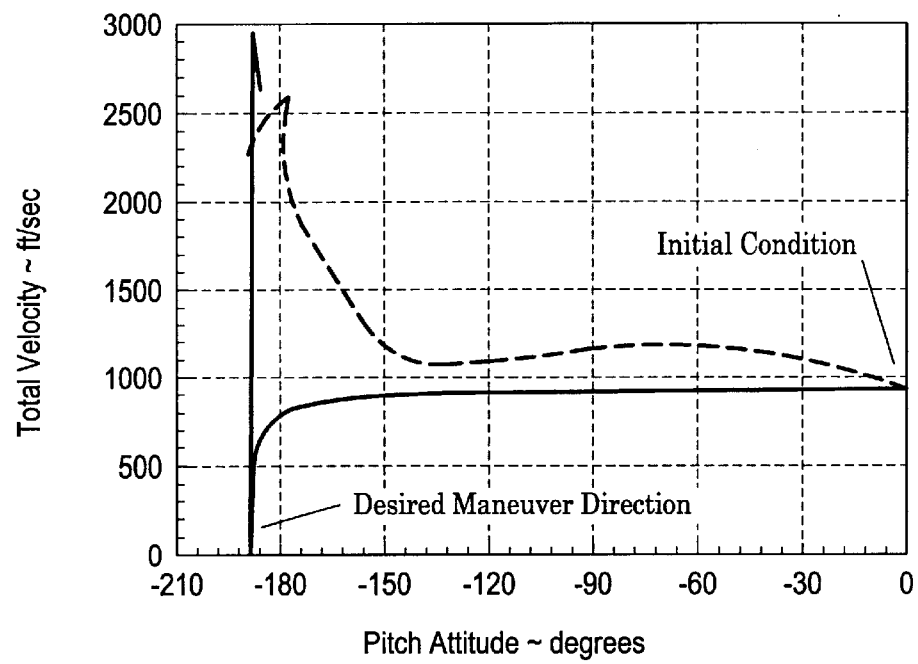
Figure 15D:
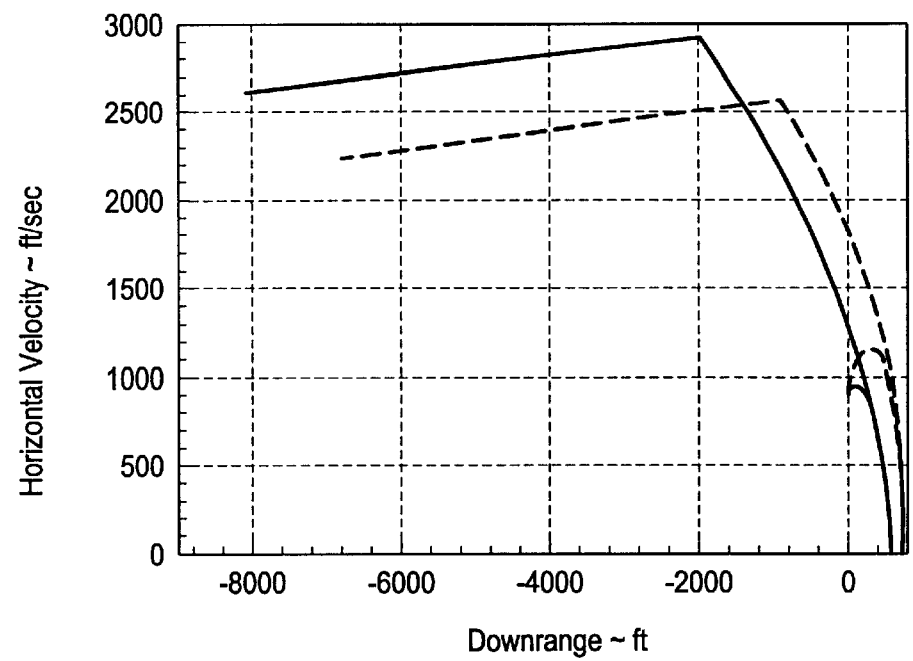

Since the missile velocity is a good indicator of the missile's energy or the efficiency of use of the axial propulsive device, the magnitude of the horizontal velocity is shown in FIG. 15D as a function of downgrade travel for the example missile performing the inventive turn and the missile performing a turn using the conventional approach for the first 5 seconds flight. At the same time, the higher velocity and downgrade travel achieved by the inventive approach shows a clear advantage over the conventional approach. The missile maneuvering in the conventional manner travels 6841.8 feet downgrade in the first five seconds of flight and has a total velocity magnitude of 2253.6 feet per second at that time. The inventive approach allows the missile to travel 8171.6 feet downgrade in the first five seconds of flight and has a total velocity magnitude of 2628.8 feet per second at that time. This is a 1.19 factor of improvement in downgrade travel and a 1.17 factor of improvement in total velocity achieved in the illustrative time allotment.

The invention also contemplates that, in a third aspect, the invention may be employed to simulate the operation of a vehicle maneuvering in accordance with the first and second aspects set forth above. It is well know in the art to simulate the operation of conventional missiles systems such as the missile system 100 in FIG. 1 in software. More particularly, the software models the control system of the vehicle and its operation. The model comprises a number of instructions encoded on a computer-readable medium, e.g., a memory device, a floppy disk, or a hard disk, that simulates the control system's operation when executed by a computer, e.g., a personal computer or a time-sharing mainframe computer. In this aspect of the invention, such software models would model a vehicle control system such as that discussed above in accordance with the first and second aspects of the invention.

This maneuver strategy, in its various embodiments, has numerous benefits over conventional techniques, including:

- the vehicle possesses improved energy when the target is reached, particularly in rear hemisphere engagements;
- a decreased radius of curvature for the maneuver;
- an improved timeline for close-in-combat engagements;
- an improved timeline for "looking" in a target's direction;
- permits close-in-combat intercepts that conventional maneuvering does not;
- provides more efficient use of control and axial propulsive energy;
- the use of drag as a constructive force as opposed to a parasitic force; and
- an improved range for rear hemisphere engagements.

These and other advantages may become apparent to those in the art having the benefit of this disclosure.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for changing a direction of travel of a vehicle moving through a fluid medium to a desired direction of travel, measured in the vehicle's inertial frame of reference, while the vehicle is traveling at a velocity adequate for producing flight sustaining aerodynamic forces on the vehicle, the vehicle comprising a body including a nose, a moment generating control device, and an axial propulsive device, the method comprising the steps of:

actuating the moment generating control device to align the nose substantially with the desired direction of travel; and for a time when a direction of the velocity of the vehicle is not substantially aligned with the desired direction of travel, applying the axial propulsive device as a primary mechanism to redirect the vehicle's velocity to the desired direction of travel.

2. A method in accordance with claim 1, wherein the vehicle is selected from the group consisting of a missile and a torpedo.

3. A method in accordance with claim 2, wherein the fluid medium is selected from the group consisting of the earth's atmosphere, a body of water, and a plasma.

4. A method in accordance with claim 1, wherein the moment generating control device is selected from the group consisting of a forward aerodynamic control device, a forward propulsive control device, an aft aerodynamic control device, and an aft propulsive device.

5. A method in accordance with claim 1, wherein the step of actuating the moment generating control device includes actuating a propulsive thruster control system.

6. A method in accordance with claim 1, wherein the step of applying the axial propulsive device includes actuating a rocket motor.

7. A method in accordance with claim 1, wherein the step of applying the axial propulsive device includes delaying an ignition thereof until the body is partially rotated.

8. A method in accordance with claim 7, wherein the step of delaying the ignition of the axial propulsive device further includes delaying the ignition thereof until the body is substantially rotated toward the desired direction of travel.

9. A method in accordance with claim 1, wherein the alignment of the nose is aided by the vehicle's missile aerodynamic rotational moment.

10. A method in accordance with claim 1, wherein the alignment of the nose is aided by a low variation of aerodynamic center-of-pressure travel as a function of the vehicle's angle-of-attack.

11. A method in accordance with claim 1, wherein the alignment of the nose is aided by a low variation of aerodynamic center-of-pressure travel as a function of the vehicle's Mach number.

12. A method in accordance with claim 1, wherein applying the axial propulsive device to redirect the vehicle's velocity is aided by an aerodynamic axial force.

13. A method in accordance with claim 1, wherein the step of actuating the moment generating control device includes actuating a propulsive device.

14. A method of claim 13, wherein the step of actuating the moment generating control device includes damping a reorientation with a propulsive device.

15. A method in accordance with claim 1, wherein the method further comprises the step of, after actuating the moment generating device to align the nose substantially with the desired direction of travel, continuing to actuate the moment generating control device so as to maintain the alignment of the nose substantially with the desired direction of travel until application of the axial propulsive device has redirected the velocity of the vehicle to a direction substantially in the desired direction of travel.

16. A vehicle adapted to move through a fluid medium, the vehicle comprising:

a body including a nose;

a moment generating control device;

an axial propulsive device; and a control system including an autopilot adapted to change the direction of travel of the vehicle to a desired direction of travel, measured in the vehicle's inertial frame of reference, while the vehicle is traveling at a velocity adequate for producing flight sustaining aerodynamic forces on the vehicle, the autopilot adapted to implement a method comprising the steps of:

actuating the moment generating control device to align the nose substantially with the desired direction of travel, and for a time when a direction of the velocity of the vehicle is not substantially aligned with the desired direction of travel, applying the axial propulsive device as a primary mechanism to redirect the vehicle's velocity to the desired direction of travel.

17. A vehicle in accordance with claim 16, wherein the vehicle is selected from the group consisting of a missile and a torpedo.

18. A vehicle in accordance with claim 17, wherein the fluid medium is selected from the group consisting of the earth's atmosphere, a body of water, and a plasma.

19. A vehicle in accordance with claim 16, wherein the moment generating control device is selected from the group consisting of a forward aerodynamic control device, a forward propulsive control device, an aft aerodynamic control device, and an aft propulsive device.

20. A vehicle in accordance with claim 16, wherein the moment generating control device includes a propulsive thruster control system.

21. A vehicle in accordance with claim 16, wherein the axial propulsive device includes a rocket motor.

22. A vehicle in accordance with claim 16, wherein the step of applying the axial propulsive device includes delaying an ignition thereof until the body is partially rotated.

23. A vehicle in accordance with claim 22, wherein the step of delaying the ignition of the axial propulsive device further includes delaying the ignition until the body is substantially rotated toward the desired direction of travel.

24. A vehicle in accordance with claim 16, wherein the autopilot is adapted to control the moment generating control device in a manner so as to align the nose substantially with the desired direction of travel in cooperation with the vehicle's aerodynamic rotational moment.

25. A vehicle in accordance with claim 16, wherein the autopilot is adapted to control the moment generating control device so as to align the nose substantially with the desired direction of travel in cooperation with a small variation of aerodynamic center-of-pressure travel as a function of the vehicle's angle-of-attack.

26. A vehicle in accordance with claim 16, wherein the autopilot is adapted to control the moment generating control device so as to align the nose substantially with the desired direction of travel in cooperation with a small variation of aerodynamic center-of-pressure travel as a function of the vehicle's Mach number.

27. A vehicle in accordance with claim 16, wherein the autopilot is adapted to apply the axial propulsive device so as to redirect the vehicle's velocity to the desired direction of travel in cooperation with an aerodynamic axial force.

28. A vehicle in accordance with claim 16, wherein the moment generating control device includes a propulsive device.

29. A vehicle in accordance with claim 16, wherein the step of actuating the moment generating control device to align the nose substantially with the desired direction of travel includes damping a reorientation with a propulsive device.

30. A vehicle in accordance with claim 16, wherein the autopilot implements the method of changing the direction of travel of the vehicle which further comprises the step of, after actuating the moment generating device to align the nose substantially with the desired direction of travel, continuing to actuate the moment generating control device so as to maintain the alignment of the nose with the desired direction of travel until application of the axial propulsive device has redirected the velocity of the vehicle to a direction substantially in the desired direction of travel.

31. A vehicle adapted to move through a fluid medium, the vehicle comprising:
   a body including a nose;
   means for generating a moment;
   means for axially propelling the vehicle; and
   means for changing the direction of travel of the vehicle to a desired direction of travel, measured in the vehicle's inertial frame of reference, while the vehicle is traveling at a velocity adequate for producing flight sustaining aerodynamic forces on the vehicle, wherein the means for changing the direction of travel implements a method comprising the steps of:
      actuating the means for generating a moment to align the nose substantially with the desired direction of travel, and
      for a time when a direction of the velocity of the vehicle is not substantially aligned with the desired direction of travel, applying the means for axially propelling the vehicle as a primary mechanism to redirect the vehicle's velocity to the desired direction of travel.

32. A vehicle in accordance with claim 31, wherein the vehicle is selected from the group consisting of a missile and a torpedo.

33. A vehicle in accordance with claim 32, wherein the fluid medium is selected from the group consisting of the earth's atmosphere, a body of water, and a plasma.

34. A vehicle in accordance with claim 31, wherein the means for generating a moment is selected from the group consisting of a forward aerodynamic control device, a forward propulsive control device, an aft aerodynamic control device, and an aft propulsive device.

35. A vehicle in accordance with claim 31, wherein the means for generating a moment includes a propulsive thruster control system.

36. A vehicle in accordance with claim 31, wherein the means for axially propelling the vehicle includes a rocket motor.

37. A vehicle in accordance with claim 31, wherein the step of applying the means for axially propelling the vehicle includes delaying an ignition thereof until the body is partially rotated.

38. A vehicle in accordance with claim 37, wherein in the step of delaying the ignition of the means for axially propelling the vehicle further includes delaying the ignition until the body is substantially rotated toward the desired direction of travel.

39. A vehicle in accordance with claim 31, wherein the means for changing the direction is adapted to control the means for generating a moment so as to align the nose substantially with the desired direction of travel in cooperation with the vehicle's missile aerodynamic rotational moment.

40. A vehicle in accordance with claim 31, wherein the means for changing the direction is adapted to control the means for generating a moment so as to align the nose substantially with the desired direction of travel in cooperation with a small variation of aerodynamic center-of-pressure travel as a function of the vehicle's angle-of-attack.

41. A vehicle in accordance with claim 31, wherein the means for changing the direction is adapted to control the means for generating a moment so as to align the nose substantially with the desired direction of travel in cooperation with a small variation of aerodynamic center-of-pressure travel as a function of the vehicle's Mach number.

42. A vehicle in accordance with claim 31, wherein the means for changing the direction is adapted to apply the means for axially propelling the vehicle to redirect the vehicle's velocity to the desired direction of travel in cooperation with an aerodynamic axial force.

43. A vehicle in accordance with claim 31, wherein the means for generating a moment includes a propulsive device.

44. A vehicle in accordance with claim 31, wherein the step of actuating the means for generating a moment to align the nose substantially with the desired direction of travel includes damping a reorientation with a propulsive device.

45. A vehicle in accordance with claim 31, wherein the means for changing the direction of travel implements the method of changing the direction of travel of the vehicle which further comprises the step of, after actuating the means for generating a moment to align the nose substantially with the desired direction of travel, continuing to actuate the means for generating a moment so as to maintain the alignment of the nose substantially with the desired direction of travel until application of the axial propulsive device has redirected the velocity of the vehicle to a direction substantially in the desired direction of travel.

46. A computer-readable medium encoded with instructions embodying a method that, when executed by a computer, simulate the control of a vehicle moving through a fluid medium, while the vehicle is traveling at a velocity adequate for producing flight sustaining aerodynamic forces on the vehicle, the vehicle comprising a body including a nose, a moment generating control device, an axial propulsive device, and an autopilot having a computer containing the instructions, the autopilot adapted to change the direction of the vehicle to a desired direction of travel measured in the vehicle's inertial frame of reference, the method comprising the steps of:
   actuating the moment generating control device to align the nose substantially with the desired direction of travel; and
   for a time when a direction of the velocity of the vehicle is not substantially aligned with the desired direction of travel, applying the axial propulsive device as a primary mechanism to redirect the vehicle's velocity to the desired direction of travel.

47. A computer-readable medium in accordance with claim 46, wherein the vehicle is selected from the group consisting of a missile and a torpedo.

48. A computer-readable medium in accordance with claim 41, wherein the fluid medium is selected from the group consisting of the earth's atmosphere, a body of water, and a plasma.

49. A computer-readable medium of claim 46, wherein the moment generating control device is selected from the group consisting of a forward aerodynamic control device, a forward propulsive control device, an aft aerodynamic control device, and an aft propulsive device.

50. A computer-readable medium in accordance with claim 46, wherein the step of actuating the moment generating control device includes actuating a propulsive thruster control system.

51. A computer-readable medium in accordance with claim 46, wherein the step of applying the axial propulsive device includes actuating a rocket motor.

52. A computer-readable medium in accordance with claim 46, wherein the step of applying the axial propulsive device includes delaying an ignition thereof until the body is at least partially rotated.

53. A computer-readable medium in accordance with claim 52, wherein the step of applying the axial propulsive device includes delaying the ignition of the axial propulsive device until the body is substantially rotated toward the desired direction of travel.

54. A computer-readable medium in accordance with claim 46, wherein the step of actuating the moment generating control device to align the nose substantially with the desired direction of travel includes actuating the moment generating control device to align the nose substantially with the desired direction of travel in a manner such that the alignment of the nose is aided by the vehicle's aerodynamic rotational moment.

55. A computer-readable medium in accordance with claim 46, wherein the step of actuating the moment generating control device to align the nose substantially with the desired direction of travel includes actuating the moment generating control device to align the nose substantially with the desired direction of travel in a manner such that the alignment of the nose is aided by a small variation of aerodynamic center-of-pressure travel as a function of the vehicle's angle-of-attack.

56. A computer-readable medium in accordance with claim 46, wherein the step of actuating the moment generating control device to align the nose substantially with the desired direction of travel includes actuating the moment generating control device to align the nose substantially with the desired direction of travel in a manner such that the alignment of the nose is aided by a small variation of aerodynamic center-of-pressure travel as a function of the vehicle's Mach number.

57. A computer-readable medium in accordance with claim 46, wherein in the method the step of applying the axial propulsive device to redirect the vehicle's velocity includes applying the axial propulsion device to redirect the vehicle's velocity to the desired direction of travel in a manner such that redirection of the vehicle's velocity is aided by an aerodynamic axial force.

58. A computer-readable medium in accordance with claim 46, wherein the step of actuating the moment generating device includes initiating the substantial alignment of the nose with the desired direction of travel by actuating a propulsive device.

59. A computer-readable medium in accordance with claim 46, wherein the step of actuating the moment generating control device to align the nose substantially with the desired direction of travel includes damping a reorientation with a propulsive device.

60. A computer-readable medium in accordance with claim 46, wherein the method further comprises the step of, after actuating the moment generating control device to align the nose substantially with the desired direction of travel, continuing to actuate the moment generating control device so as to maintain the alignment of the nose with the desired direction of travel until the axial propulsive device has redirected the velocity of the vehicle to a direction substantially in the desired direction of travel.

61. A computer-readable medium encoded with instructions executable by a computer, for use in a vehicle moving through a fluid medium, the instructions embodying a method for changing the direction of the vehicle while the vehicle is traveling at a velocity adequate for producing flight sustaining aerodynamic forces, the vehicle comprising a body including a nose, an autopilot having a computer, a moment generating control device, and an axial propulsive device, the instructions being executable by the computer of the autopilot to change the direction of the vehicle to a desired direction of travel measured in the vehicle's inertial frame of reference, the method comprising the steps of:

actuating the moment generating control device to align the nose substantially with the desired direction of travel; and for a time when a direction of the velocity of the vehicle is not substantially aligned with the desired direction of travel, applying the axial propulsive device as a primary mechanism to redirect the vehicle's velocity to the desired direction of travel.

62. A computer-readable medium in accordance with claim 61, wherein the vehicle is selected from the group consisting of a missile and a torpedo.

63. A computer-readable medium in accordance with claim 62, wherein the fluid medium is selected from the group consisting of the earth's atmosphere, a body of water, and a plasma.

64. A computer-readable medium in accordance with claim 61, wherein the moment generating control device is selected from the group consisting of a forward aerodynamic control device, a forward propulsive control device, an aft aerodynamic control device, and an aft propulsive device.

65. A computer-readable medium in accordance with claim 61, wherein the step of actuating the moment generating control device includes actuating a propulsive thruster control system.

66. A computer-readable medium in accordance with claim 61, wherein the step of applying the axial propulsive device includes actuating a rocket motor.

67. A computer-readable medium in accordance with claim 61, wherein the step of applying the axial propulsive device includes delaying an ignition thereof until the body is partially rotated.

68. A computer-readable medium in accordance with claim 67, wherein the step of delaying the ignition of the axial propulsive device includes delaying the ignition until the body is substantially rotated toward the desired direction of travel.

69. A computer-readable medium in accordance with claim 61, wherein the step of actuating the moment generating control device to align the nose substantially with the desired direction of travel includes actuating the moment generating control device to align the nose substantially with the desired direction of travel in a manner such that the alignment of the nose is aided by the vehicle's missile aerodynamic rotational moment.

70. A computer-readable medium in accordance with claim 61, wherein the step of actuating the moment generating control device to align the nose substantially with the desired direction of travel includes actuating the moment generating control device to align the nose substantially with the desired direction of travel in a manner such that the alignment of the nose is aided by a small variation of aerodynamic center-of-pressure travel as a function of the vehicle's angle-of-attack.

71. A computer-readable medium in accordance with claim 61, wherein the step of actuating the moment generating control device to align the nose substantially with the desired direction of travel includes actuating the moment generating control device to align the nose substantially with the desired direction of travel in a manner such that the alignment of the nose is aided by a small variation of aerodynamic center-of-pressure travel as a function of the vehicle's Mach number.

72. A computer-readable medium in accordance with claim 61, wherein in the step of applying the axial propulsive device to redirect the vehicle's velocity, redirection of the vehicle's velocity is aided by an aerodynamic axial force.

73. A computer-readable medium in accordance with claim 61, wherein the step of actuating the moment generating control device includes actuating a propulsive device.

74. A computer-readable medium in accordance with claim 61, wherein the step of actuating the moment generating control device to align the nose substantially with the desired direction of travel includes damping a reorientation with a propulsive device.

75. A computer-readable medium in accordance with claim 61, wherein the method further comprises the step of, after actuating the moment generating device to align the nose substantially with the desired direction of travel, continuing to actuate the moment generating control device so as to maintain the alignment of the nose substantially with the desired direction of travel until application of the axial propulsive device has redirected the velocity of the vehicle to a direction substantially in the desired direction of travel.

76. A method for changing an initial direction of travel of a vehicle to a desired direction of travel measured in the vehicle's inertial frame of reference as the vehicle is moving through a fluid medium at a velocity adequate for producing flight sustaining aerodynamic forces on the vehicle, the vehicle comprising a body including a nose, a moment generating control device, and an axial propulsive device, the method comprising the steps of:

actuating the moment generating control device to rotate the vehicle until a longitudinal axis of the vehicle is at least substantially transverse to the initial direction of travel of the vehicle;

using aerodynamic forces to assist the moment generating control device to rotate the body until the nose is aligned substantially with the desired direction of travel of the vehicle; and then for a time when a direction of the velocity of the vehicle is not substantially aligned with the desired direction of travel of the vehicle, applying the axial propulsive device as a primary mechanism to redirect the vehicle's velocity to the desired direction of travel.

77. A method in accordance with claim 76, wherein for a time when the direction of the velocity of the vehicle is not substantially aligned with the desired direction of travel of the vehicle, continuing to actuate the moment generating control device to maintain the substantial alignment of the nose with the desired direction of travel until the axial propulsive device has redirected the velocity of the vehicle to a direction substantially in the desired direction of travel.

78. A control logic method adapted to be utilized by a vehicle control unit for use in changing an initial flight path of the vehicle to a desired flight path measured in the vehicle's inertial frame of reference as the vehicle is moving through a fluid medium at a velocity adequate for producing flight sustaining aerodynamic forces on the vehicle, the vehicle having a body including a nose, a forward thruster control unit, an axial propulsive device, and a plurality of control surfaces, the vehicle control unit being adapted to receive signals from a guidance control system, said control logic method comprising the steps of:

receiving a command signal from the guidance control system, said command signal representing a magnitude and a direction of a desired flight path angle of the vehicle;

converting said command signal to a forward thruster control signal, said forward thruster control signal controlling a response of the forward thruster control unit;

actuating the forward thruster control unit to rotate the vehicle to reduce the angle between the initial flight path and the desired flight path by initiating a resulting moment imparted to the vehicle by actuation of the forward thruster control unit;

for a time when a direction of the velocity of the vehicle is not substantially aligned with the desired flight path of the vehicle, continuing to actuate the forward thruster control unit to continue imparting a resulting moment to the vehicle to maintain the nose substantially in the desired flight path until the velocity of the vehicle is substantially aligned with the desired flight path of the vehicle; and applying the axial propulsive device as a primary mechanism to redirect the velocity of the vehicle to a direction of the desired flight path.

79. A vehicle control unit for use in controlling a vehicle having a nose, a control surface aft of the nose, a moment generating device, and an axial thrust control device, the control unit having a computer-readable medium encoded with instructions embodying a control logic method for controlling the vehicle when reorienting the vehicle from an initial flight path to a desired flight path measured in the vehicle's inertial frame of reference as the vehicle is moving through a fluid medium at a velocity adequate for producing flight sustaining aerodynamic forces on the vehicle, said control logic method comprising the steps of:

receiving a command signal from a guidance control system, said command signal representing a direction of a desired flight path angle;

converting the desired flight path angle to an angle-of-attack command to stabilize the vehicle;

controlling a response of the control surface in order to affect drag in a manner such that the drag assists the vehicle reorientation;

initiating a control force to the moment generating device and thereby producing a resulting moment to rotate the vehicle to reduce the angle between the initial flight path and the desired flight path; and when the vehicle is substantially rotated to reduce the angle between the initial flight path and the desired flight path, applying the axial thrust propulsive device as a primary mechanism to redirect the velocity of the vehicle to a direction of the desired flight path.

80. A vehicle control unit in accordance with claim 79, wherein the vehicle control unit implements the method of changing the direction of travel of the vehicle which further comprises the step of, after actuating the moment generating device, rotating the vehicle to reduce the angle between the initial flight path and the desired flight path, continuing to actuate the moment generating control device so as to maintain the vehicle substantially along the desired flight path until application of the axial thrust propulsive device has redirected the velocity of the vehicle to a direction substantially in a direction of the desired flight path.

81. A vehicle adapted for rapid redirection of the flight path and velocity as the vehicle is moving through a fluid medium at a velocity adequate for producing flight sustaining aerodynamic forces on the vehicle, said vehicle comprising:

a body including a nose;

a plurality of control devices, said control devices being-adapted to impart either a moment or a force to the vehicle in a manner such that the flight path and the velocity of the vehicle are rapidly redirected, said plurality of control devices comprising at least:
a forward thruster control device,
an axial propulsive device, and
a plurality of control surfaces positioned on the body between the forward thruster control device and the axial propulsive device; and a vehicle control unit adapted to control the control devices in a manner such that the forward thruster control device is used as a primary mechanism to align the nose with the desired direction of travel;

the forward thruster control device is used as a primary mechanism to maintain the alignment of the nose with the desired direction of travel until the velocity of the vehicle is substantially aligned with the desired direction of travel of the vehicle; and the axial propulsive device is used as a primary mechanism to redirect the vehicle's velocity to the desired direction of travel.

* * * * *

UNITED STATES PATENT AND TRADEMARK OFFICE
CERTIFICATE OF CORRECTION

PATENT NO.   : 6,308,911 B1
DATED        : October 30, 2001
INVENTOR(S)  : Wayne K. Schroeder Page 1 of 1

It is certified that error appears in the above-identified patent and that said Letters Patent is hereby corrected as shown below:

<u>Column 9,</u>
Line 47, delete "FIG. 1 SA", and insert -- FIG. 15A --.

<u>Column 14,</u>
Line 63, delete "41", and insert -- 47 --.

Signed and Sealed this

Twenty-first Day of May, 2002

Attest:

JAMES E. ROGAN
*Director of the United States Patent and Trademark Office*

*Attesting Officer*